(12) United States Patent
Raykhtsaum et al.

(10) Patent No.: US 9,655,414 B2
(45) Date of Patent: May 23, 2017

(54) AGE HARDENABLE CLAD METAL HAVING SILVER FINENESS AND A SURFACE LAYER WITH ENHANCED RESISTANCE TO TARNISH, SCRATCHING, AND WEAR

(71) Applicant: RICHLINE GROUP, INC., New York, NY (US)

(72) Inventors: Grigory Raykhtsaum, Sharon, MA (US); Joseph Esposito, Wakefield, RI (US)

(73) Assignee: LeachGarner, Inc., Attleboro, MA (US)

(*) Notice: Subject to any disclaimer, the term of this patent is extended or adjusted under 35 U.S.C. 154(b) by 0 days.

(21) Appl. No.: 14/851,521

(22) Filed: Sep. 11, 2015

(65) Prior Publication Data
US 2016/0081442 A1    Mar. 24, 2016

Related U.S. Application Data

(60) Provisional application No. 62/052,785, filed on Sep. 19, 2014.

(51) Int. Cl.
*A44C 27/00* (2006.01)
*C22C 5/02* (2006.01)
*C22C 5/06* (2006.01)
*B32B 15/01* (2006.01)

(52) U.S. Cl.
CPC .......... *A44C 27/003* (2013.01); *B32B 15/018* (2013.01); *C22C 5/02* (2013.01); *C22C 5/06* (2013.01)

(58) Field of Classification Search
None
See application file for complete search history.

(56) References Cited

U.S. PATENT DOCUMENTS

| | | |
|---|---|---|
| 2,365,083 A | 12/1944 | Jarrett |
| 2,389,981 A | 11/1945 | Jarrett |
| 2,474,038 A | 6/1949 | Davignon |
| 2,814,095 A | 11/1957 | Lieberman |
| 3,199,189 A | 8/1965 | La Plante |
| 3,245,764 A | 4/1966 | La Plante |
| 3,475,811 A | 11/1969 | Clarke et al. |
| 3,607,150 A | 9/1971 | McGinn |
| 4,260,095 A | 4/1981 | Smith |
| 4,354,301 A | 10/1982 | Takeuchi et al. |
| 4,475,991 A | 10/1984 | Shibata |
| 4,777,098 A | 10/1988 | Takamura et al. |

(Continued)

*Primary Examiner* — Adam Krupicka
(74) *Attorney, Agent, or Firm* — Gottlieb, Rackman & Reisman, P.C.

(57) ABSTRACT

The present invention is directed to a jewelry element which includes two layers—a cladding layer and a substrate layer, each layer being its own alloy. The cladding layer and the substrate layer each include a base metal such as silver or gold at the same percentages so that the resulting jewelry element can be labeled in accordance with one or more industry-wide requirements. The cladding layer is further enhanced by introduction of a metal providing additional hardness when included in the alloy. By limiting the "hardness" metal or metals to being deposed only in the cladding layer, less of the hardness metal need be used, thereby reducing cost yet retaining the requisite hardness characteristic. Each of the alloys may further contain other metals for any of a number of reasons, including but not limited to, tarnish resistance.

18 Claims, 3 Drawing Sheets

Clad cross section.

(56) References Cited

U.S. PATENT DOCUMENTS

| | | | |
|---|---|---|---|
| 4,826,736 A | 5/1989 | Nakamura et al. |
| 4,980,245 A | 12/1990 | Marino |
| 5,370,753 A | 12/1994 | Lees et al. |
| 5,531,371 A | 7/1996 | Matsuzawa |
| 5,876,862 A | 3/1999 | Shibuya et al. |
| 6,092,358 A | 7/2000 | Grosz |
| 6,514,630 B2 | 2/2003 | Matsuzawa et al. |
| 8,113,413 B2 | 2/2012 | Miller et al. |

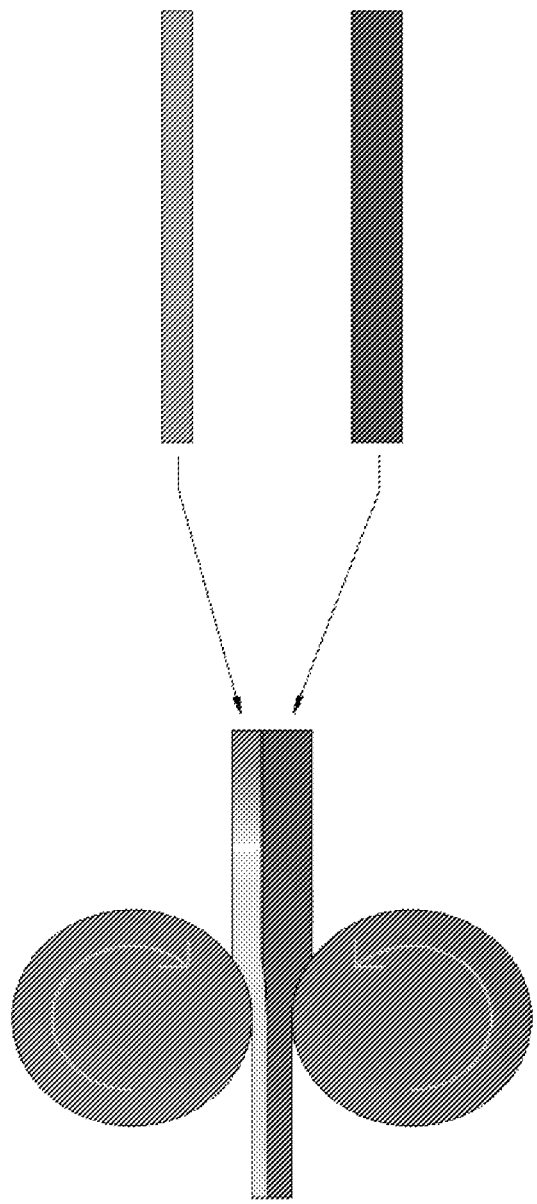
Figure 1. Bonding of two metals under the rolling pressure.
"PRIOR ART"

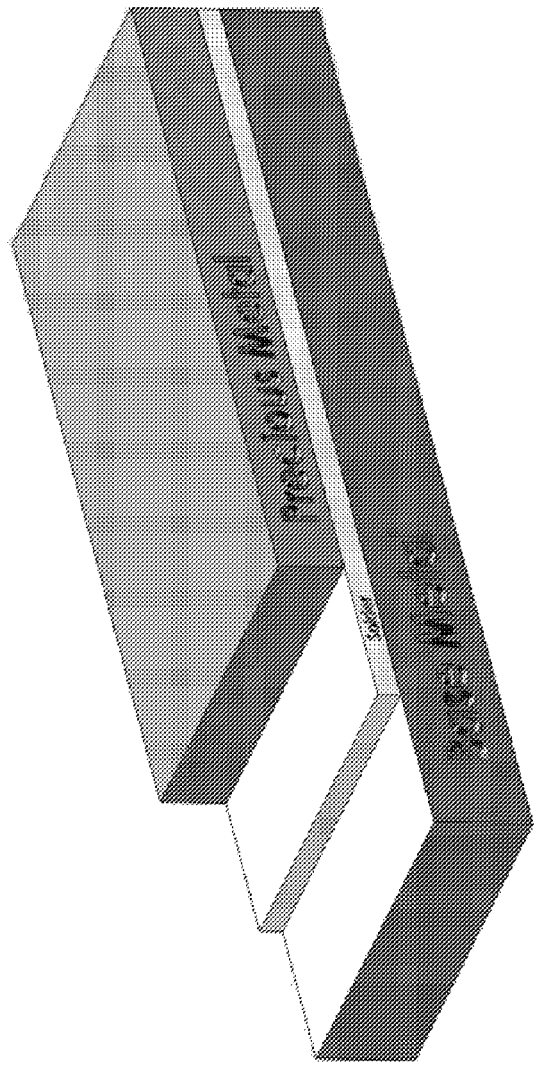
Figure 2. Two metals may be braze-bonded by using a solder sheet in between.
"PRIOR ART"

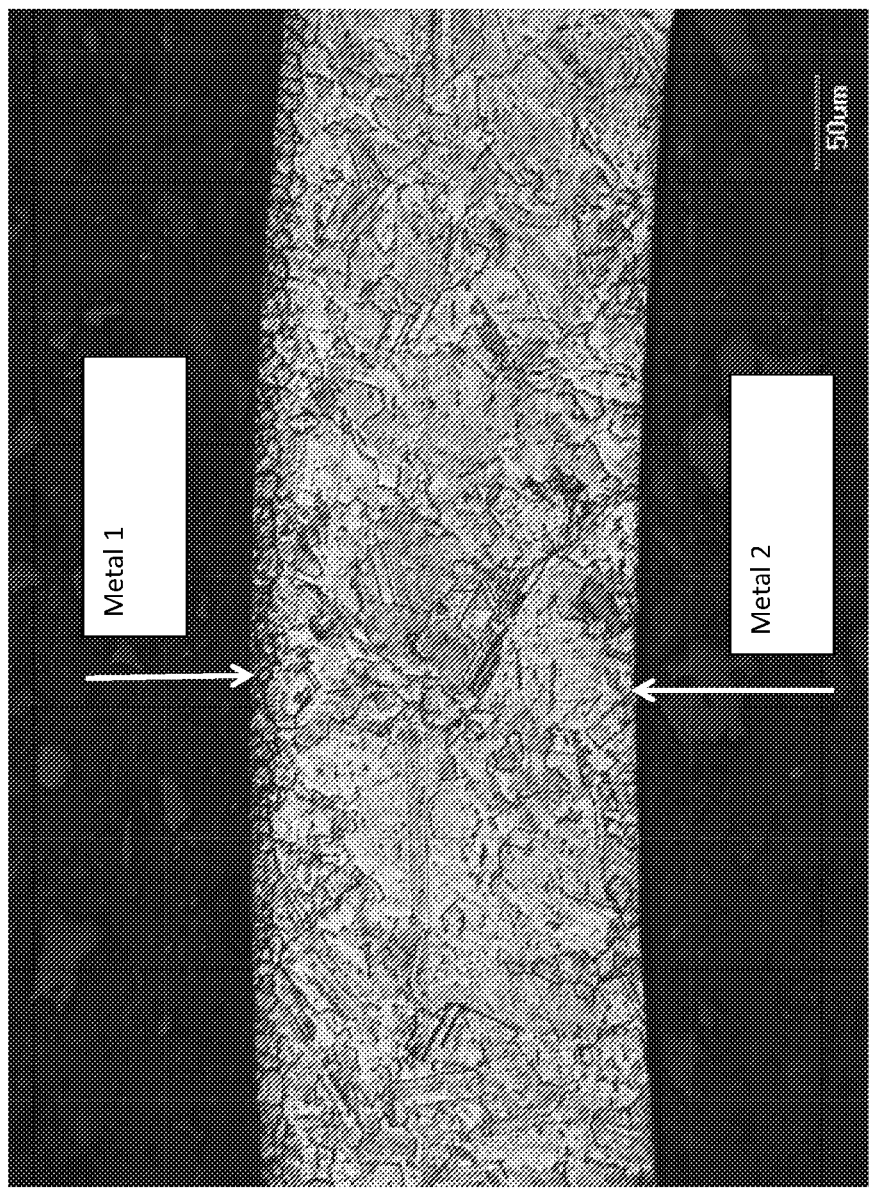
Figure 3. Clad cross section.

AGE HARDENABLE CLAD METAL HAVING SILVER FINENESS AND A SURFACE LAYER WITH ENHANCED RESISTANCE TO TARNISH, SCRATCHING, AND WEAR

This application claims priority to U.S. Provisional Patent Application No. 62/052,785, filed on Sep. 19, 2014, and incorporated herein by reference.

BACKGROUND OF THE INVENTION

In general, composite clad metal, such as used for jewelry, contains two or more layers of dissimilar metals bonded together by either atomic or metallurgical bond.

The first precious metal clad of sterling silver on copper known as "Old Sheffield Plate" was commercially realized in the middle of 18$^{th}$ century in England. Since then some precious metal cladding such as gold filled (usually karat gold on brass), karat gold on silver, or other precious metal alloys on base metal have been used for making jewelry as well as for industrial applications, such as electrical contacts—all to achieve two main objectives:

- To significantly save on total material cost of precious metals
- To combine such unique properties of precious metals such as but not limited to corrosion and tarnish resistance, attractive color, high electrical and thermal conductivity with the desirable mechanical properties of the base metal.

Several processes are known to produce a strong bond between two or more layers of precious and base metals. All processes involve a combination of pressure and heat:

- Cold roll bonding is a simple process where two or more different metal sheets are passed through a rolling mill that creates pressure sufficient enough for establishing a strong atomic bond between layers (FIG. 1).
- Hot roll bonding is more effective in achieving a strong bond but also is more complex. In hot roll bonding, the bonding is achieved at least in part due to a high temperature bonding process.
- Braze bonding is a process where a layer of solder foil is placed between the layers of metal (FIG. 2), a static weight load is applied to a whole package and the brazing is done in a furnace within a protective atmosphere.

Silver Metals

In all such clad composite materials, the overall precious metal content historically becomes diluted to a fraction of that of the original precious metal alloy. That is, the precious metal content in one portion is lower than the precious metal in the other portion, and the combined precious metal content overall is less than that required for the jewelry element to be named as consisting of that precious metal. For jewelry applications specifically, certain regulatory requirements, such as but not limited to those in the U.S. Gold and Silver Stamping Act and Federal Trade Commission Guides, require that such clad metals cannot be stamped as solid precious metal alloys when not meeting defined criteria. For example, karat gold clad on sterling silver can be stamped neither as karat gold, nor as sterling silver.

When solder is used for braze bonding, for example, it is a common practice to increase the silver content of the substrate (metal 2) to compensate for solder not being sterling silver. Eventually, during material processing (rolling) the solder layer becomes negligibly thin, and the clad practically remains sterling-on-sterling.

Only the clad metal that consists of two (or more) similar sterling silver metals bonded together satisfies the legal requirement for stamping as solid homogeneous sterling silver. This is especially beneficial when one of the sterling silver metals has an enhanced property such as resistance to tarnish, whereas all other properties such as mechanical properties and color are similar to those of the second metal.

In addition, for an alloy to be markable as "silver", the alloy must contain at least 92.5% silver.

Only the clad alloy that consists of two (or more) similar same karat gold alloys bonded together satisfies the legal requirement for stamping as a solid homogeneous karat gold. That is, the total percentage of gold determines the karat of the piece. Having a similar amount of gold content in the cladding layer and the substrate layer is especially beneficial in that the gold is, in effect, uniformly distributed. Also, by limiting additional more expensive metals for other purposes, such as palladium for color, to the cladding layer, the total cost is reduced. Further, other than having certain metals in select of the alloys for particular purposes, there is sufficient benefit to having both the cladding and substrate layers having similar mechanical properties. It is desirable therefore, to provide the jewelry industry with the karat gold clad material that combines the properties of both alloys at the same time and that can be stamped as solid homogeneous karat or silver) alloy in accordance with the requirements of the Stamping Act, FTC Guides, and/or other criteria.

It is desirable therefore, to provide the jewelry industry with a sterling silver clad material that combines the properties of both the substrate and cladding alloys and so that the jewelry element may properly be stamped sterling silver by virtue of it containing a 92.5% silver minimum as if it is a homogeneous sterling silver alloy.

Gold Metals

Recent legislative developments in Europe practically banned nickel containing white karat gold alloys for jewelry applications and left the industry with the practically only option of more expensive palladium containing white karat gold alloys. The use of hardenable palladium containing white golds offers some savings on cost of palladium. The clad of thin layer of palladium containing hardenable white karat gold (similar to those described in U.S. Pat. Nos. 5,919,320 and 7,135,078) on palladium-free hardenable yellow karat gold (similar to that described in U.S. Pat. No. 6,676,776) offers a significant reduction in palladium cost. Such clad also offers all the benefits of hardenable alloys, and satisfy legal requirements for stamping as solid homogeneous karat gold. Moreover, such clad is in line with white gold grading and can be rhodium plated as white gold.

Table 1 below illustrates the reduction of palladium content in the clad. Alloy 1 is from the U.S. Pat. No. 5,919,320, and alloy 2 is from U.S. Pat. No. 6,676,776.

TABLE 1

| Element | Alloy 1 (top 10% by thickness) | Alloy 2 (substrate 90% by thickness) | Combined |
|---|---|---|---|
| Au | 58.50 | 58.50 | 58.5 |
| Ag | 18.90 | 13.50 | 14.08 |
| Pd | 12.00 | | 1.28 |
| Co | 0.20 | 0.40 | 0.38 |
| Zn | | 4.50 | 4.02 |
| Sn | 0.15 | | 0.02 |
| In | 0.15 | | 0.02 |
| Cu | 10.10 | 23.10 | 21.71 |

It is also desirable therefore, to provide the jewelry industry with a gold-clad material that combines the properties of both the substrate and cladding alloys and so that the jewelry element may properly be stamped as of a selected gold karat and that the gold distribution is generally consistent between the clad and substrate elements.

BRIEF DESCRIPTION OF THE FIGURES

FIG. 1 depicts the bonding of two alloys under rolling pressure.

FIG. 2 depicts two alloys which are braze bonded using a solder sheet between them.

FIG. 3 depicts a clad cross section.

DETAILED DESCRIPTION OF THE INVENTION

The present invention is directed to a jewelry element that implements a cladding alloy and a differing substrate alloy such that the overall jewelry element meets the requirements of being called "sterling silver", has homogeneity of silver content, and is formed using any of a variety of cladding techniques.

In a second embodiment, the present invention is directed to a jewelry element that implements a cladding alloy and a differing substrate alloy such that the overall jewelry element meets the requirements of being called a particular karat gold, has homogeneity of gold content, and is formed using any of a variety of cladding techniques.

In short, a goal of the present invention is a jewelry element which includes two layers—a cladding layer and a substrate layer, each layer being its own alloy. The cladding layer and the substrate layer each include a base metal such as silver or gold at the same percentages so that the resulting jewelry element can be labeled in accordance with one or more industry-wide requirements.

The cladding layer, the substrate layer, or both is further enhanced by introduction of a metal providing additional hardness when included in the alloy or a process for hardening. By limiting the "hardness" metal or metals to being deposed only in the cladding layer, less of the hardness metal need be used, thereby reducing cost yet retaining the requisite hardness characteristic.

Hardenable alloys and hardness. For regular karat gold alloys (not hardenable) regardless of color, the typical Vickers hardness values in the annealed condition are within the 130-150 range.

For hardenable karat gold alloys regardless of color, the typical Vickers hardness values are Annealed condition—within the 140-160 range; Age hardened condition—within the 230-260 range. For traditional sterling silver alloy (92.5% silver and 7.5% copper) the Vickers hardness in the annealed condition is within 60-80 range. This alloy may be age hardened to about 100-110 Vickers.

For hardenable sterling silver alloys the typical Vickers hardness in the annealed condition is within the 60-90 range. The age hardening usually brings the hardness up to 120-140 Vickers. Some special palladium containing sterling silver alloys may be hardened up to 140-170 Vickers.

Each of the alloys may further contain other metals for any of a number of reasons, including but not limited to tarnish resistance.

Resistance to tarnish is a critical property for sterling silver alloys. On the scale 1 to 5, one may grade the tarnish rate for commercially available sterling silver alloy as follows:

Traditional sterling silver—5. Not tarnish resistant alloy.

Some tarnish resistant and hardenable sterling silver alloys—between 4 and 3. These are tarnish resistant alloys.

Some special palladium containing sterling silver alloys—2. Exceptionally tarnish resistant alloys.

For a comparison, the tarnish rate for a typical 14K yellow alloy is about 1.

The present invention allows for a variety of combinations of metals in the alloys so that, in one example, tarnish resistance can be improved.

FIG. 3 shows a cross section of such a clad with two distinct alloys: thin layer of Alloy 1 on top of the substrate Alloy 2. The chemistry of Alloy 1 in combination with Alloy 2 and the resulting cladding such as is shown in Table 2 below.

Both cold and hot roll bonding does not utilize solder, and therefore, in the clad of Table 2 below, any portion of the clad (regardless of where it is sampled) is 92.5% wt. minimum silver. In this respect, this clad is a homogeneous 92.5% wt. silver material (other elements in this material are not homogeneous). NOTE: The symbol "%" as used throughout this application with reference to the percentage of metal in the composition is understood to be weight percent (at times also abbreviated "w %").

The present invention therefore is directed to a formed alloy, such as for jewelry, whereby the substrate and top (or cladding) layers are bonded together, each of the substrate and the top layer has the same percentage makeup of a base metal (for example, silver), each has other metals, elements, and/or compounds, and the bonding is such that the end product has homogeneity of the base metal (in this example, silver) and positive attributes of the other metals, elements, and/or compounds.

The present invention is further directed to a composition for cladding, preferably represented by the distribution by weight shown in Table 2. Cladding two different sterling silver metals changes the overall composition of all the elements except silver—silver content stays at, for example, 92.5%.

TABLE 2

| Element | Alloy 1 (top 10% by thickness) | Alloy 2 (substrate 90% by thickness) | Clad |
|---|---|---|---|
| Ag | 92.5 minimum | 92.5 minimum | 92.5 minimum |
| Pd | 2.5 | | 0.25 |
| Zn | 0.5 | 0.7 | 0.68 |
| Sn | | 0.85 | 0.765 |
| Ge | | 0.5 | 0.45 |
| Li | | 0.05 | 0.045 |
| Si | 0.035 | 0.05 | 0.0485 |
| Cu | Balance | Balance | Balance |

Using Pd by example, by introducing but limiting the overall amount of Pd, such as limited to the clad metal of Table 2, the overall cost for materials is reduced, yet the solution herein results in beneficial tarnish and wear resistance.

Importantly, for purposes of cladding, the thickness of overall Alloy 1 can be from 5-50% and the thickness of Alloy 2 can be from 50-95%.

EXAMPLE 1

In particular, a known substrate metal (Ag) is preferably used. Such a substrate metal is described in U.S. Pat. No.

7,198,683 to Agarwal and Raykhtsaum ("Agarwal"). In that patent, Agarwal describes sterling silver alloys that can be age hardened by heat treatment. Similar age hardenable alloys are described in U.S. Patent Publication Nos. 2013/0112322 and 2014/0127075. The alloys described in the latter publications exhibit enhanced tarnish resistance due to the presence of palladium in alloy compositions. Making the clad of thin layer of such alloys on a bulk of former alloy described by U.S. Pat. No. 7,198,683 results in less expensive sterling silver material that is age hardenable with the surface showing enhanced resistance to tarnish. FIG. 3 shows a cross section of such a clad with two distinct metals: thin layer of Metal 1 on top of the substrate Metal 2. The chemistry of Metal 1, Metal 2 and the resulting Clad is shown in the Table 1. Cladding two different sterling silver alloys changes the overall composition of all the elements except silver—silver content stays 92.5%.

Introducing a cladding, such as the alloys described in the latter publications, together with a base metal of Agrawal results in less expensive sterling silver material that is age hardenable with the surface showing enhanced resistance to tarnish.

EXAMPLE 2

Example 2 illustrates the clad of two sterling silver alloys where alloy 1 is hardenable with the exceptionally high resistance to tarnish, and alloy 2 is tarnish resistant but not hardenable, so that the resultant clad is tarnish resistant with the hardenable top. This results in tarnish resistant sterling silver material with the surface layer that shows enhanced hardness and resistance to scratching and wear. In this example, hot roll bonding is used. In general, the temperature used for hot roll bonding can be anywhere from 500 F to 1200 F, depending on alloys, material size, and rolling mill type.

EXAMPLE 3

Example 3 illustrates the clad of two sterling silver alloys where alloy 1 is hardenable with exceptionally high resistance to tarnish, and alloy 2 is traditional sterling (92.5% silver and 7.5% copper), so that the resultant clad provides the surface with enhanced hardness and tarnish resistance in comparison with traditional sterling silver. This results in sterling silver clad material with the surface layer that shows enhanced resistance to tarnish, higher hardness and resistance to scratching and wear. In this example, hot roll bonding is used.

Traditionally, clad metal is a composite of two or ore dissimilar metals bonded together. The bond is usually achieved by applying pressure and heat. Typical methods are cold roll hot roll bonding, as well as braze bonding. In jewelry clad metal of gold and silver alloys on brass is mainly manufactured to make gold-filled and silver-filled products. Respective gold and silver content is reduced in such materials down to 1/10-1/40 by weight range. This is done specifically to reduce the precious metal cost. The proposed invention deals with the similar metal clad such as sterling silver on sterling silver and karat gold on karat gold with the objective to reduce total palladium content in white color gold and silver in the composites whereas to maintain karat gold and sterling silver requirement.

Examples 4-6 illustrate reduced palladium 14K gold clad options using commercial karat gold alloys. Examples 7 and 8 illustrate similar options for 18K gold. Examples 9 and 10 illustrate sterling silver on sterling silver options. In all these examples the clad layer thickness is set to 10% of the total size for illustration purposes. Although shown in these examples as the clad layer representing 10% of the total size, in general, the clad thickness fraction may vary depending on, for example, manufacturing and cost considerations. Nominally, the clad thickness can vary from 5% to 25%. All the alloys in these examples are nickel-free to be in line with the European nickel-related regulations.

In the examples that follow, unless otherwise stated, the metal percentages are weight percentage.

EXAMPLE 4

Alloy 1 is a nickel-free 14K white that contains 9.4% palladium. Such high palladium content significantly increases the cost of this 14K alloy. It is evident that the composite of 10% by thickness clad of alloy 1 on 90% by thickness of common 14K yellow substrate alloy 2 preserves 14K requirement (58.5% gold), whereas the overall palladium content (and therefore the cost) in such composite is significantly reduced down to 1%. Such clad can be made by cold and hot roll bonding technique. It also can be made using braze bonding when 14K solder is used. The jewelry article made with such clad sheet, wire or tubing has an appearance of 14K white gold, and it can be called white gold jewelry. However, both alloys 1 and 2 are not hardenable, and may be too soft for some applications where the surface durability such as scratch resistance is critical.

TABLE 3

|    | Alloy 1. 10% Clad layer | Alloy 2. 90% Substrate | Composite |
|----|-------------------------|------------------------|-----------|
| Au | 58.5                    | 58.5                   | 58.5      |
| Ag | 30.9                    | 4                      | 6.7       |
| Pd | 9.4                     |                        | 1.0       |
| Cu | 1.2                     | 32.5                   | 29.0      |
| Zn |                         | 5                      | 4.4       |

EXAMPLE 5

This example (Table 4) illustrates the clad 10% by thickness of hardenable 14K white alloy 3 on 90% by thickness common 14K yellow substrate alloy 2, Palladium content (and therefore the cost) in such 14K clad is reduced from 12% to 1.3%. As the surface layer is hardenable, the overall composite shows improved surface durability. Alloy 2 is not hardenable, and may not be suitable for some applications when the increased strength is required for the whole clad material.

TABLE 4

|    | Alloy 3. 10% Clad layer | Alloy 2. 90% Substrate | Composite |
|----|-------------------------|------------------------|-----------|
| Au | 58.5                    | 58.5                   | 58.5      |
| Ag | 18.9                    | 4                      | 5.5       |
| Pd | 12                      |                        | 1.3       |
| Cu | 10                      | 32.5                   | 30.0      |
| Zn | 0.6                     | 5                      | 4.5       |

EXAMPLE 6

This example (Table 5) shows the clad option where both alloys of the clad layer (alloy 3) and of the substrate (alloy 4) are hardenable. Again, the overall composite is 14K and palladium is reduced from 12% down to 1.3%.

TABLE 5

|    | Alloy 3. 10% Clad layer | Alloy 4. 90% Substrate | Composite |
|----|------|------|-------|
| Au | 58.5 | 58.5 | 58.5  |
| Ag | 18.9 | 12   | 12.7  |
| Pd | 12   |      | 1.3   |
| Cu | 10   | 25.5 | 223.8 |
| Zn | 0.6  | 4    | 3.6   |

EXAMPLE 7

This example (Table 6) illustrates the 18K option where the clad layer alloy 5 has an exceptionally good white color due to fairly high palladium content of 14.9%. Alloy 5 is not hardenable. The alloy 6 of the substrate is hardenable 18K yellow. The overall clad is 18K with the significantly reduced palladium down to 2.7%. Such clad can be made by cold and hot roll bonding technique. It also can be made using braze bonding when 18K solder is used.

TABLE 6

|    | Alloy 5. 10% Clad layer | Alloy 6. 90% Substrate | Composite |
|----|------|------|------|
| Au | 75   | 75   | 75.0 |
| Ag | 5    | 12.5 | 10.9 |
| Pd | 14.9 |      | 2.7  |
| Cu | 5.1  | 12.5 | 11.5 |
| Zn |      |      | 0.0  |

EXAMPLE 8

This example (Table 7) illustrates the option where the hardenability of both alloys of the clad and of the substrate is required. Alloy 7 is hardenable 18K white containing 7% palladium. Overall composite is 18K with reduced palladium down to 0.7%.

TABLE 7

|    | Alloy 7. 10% Clad layer | Alloy 6. 90% Substrate | Composite |
|----|------|------|------|
| Au | 75   | 75   | 75.0 |
| Ag | 5.5  | 12.5 | 11.7 |
| Pd | 7    |      | 0.7  |
| Cu | 10   | 12.5 | 12.2 |
| Zn | 2.5  |      | 0.3  |

EXAMPLE 9

In this example (Table 8) sterling silver alloy 8 is hardenable with the enhanced resistance to tarnish as it contains 2.5% palladium. Cladding this alloy with another palladium-free exceptionally hardenable sterling silver alloy 9 reduces palladium (and therefore the cost) in overall composite down to 0.25%. The surface layer of such clad shows exceptional resistance to tarnish. The overall composite is hardenable and can be called sterling silver as it maintains 92.5% silver total.

TABLE 8

|    | Alloy 8. 10% Clad layer | Alloy 9. 90% Substrate | Composite |
|----|-------|------|--------|
| Ag | 92.5  | 92.5 | 92.5   |
| Pd | 2.5   |      | 0.25   |
| Zn | 0.5   | 0.7  | 0.68   |
| Sn |       | 0.85 | 0.765  |
| Ge |       | 0.5  | 0.45   |
| Li |       | 0.05 | 0.045  |
| Si | 0.035 | 0.05 | 0.0485 |
| Cu | 4.465 | 5.35 | 5.2615 |

EXAMPLE 10

This example (Table 9) illustrates the clad option of alloy 8 on traditional sterling silver alloy 10 (92.5% silver and 7.5% copper). This option is suitable when there is no need for the substrate alloy to be exceptionally hardenable.

TABLE 9

|    | Alloy 8. 10% Clad layer | Alloy 10. 90% Substrate | Composite |
|----|-------|------|------|
| Ag | 92.5  | 92.5 | 92.5 |
| Pd | 2.5   |      | 0.25 |
| Zn | 0.5   |      | 0.05 |
| Si | 0.035 |      |      |
| Cu | 4.465 | 7.5  | 7.2  |

The invention claimed is:

1. A cladded jewelry element comprising:
a composite substrate layer formed of a first alloy; and
a composite cladding layer formed of a second alloy comprising from about 1-2.5 w % palladium;
wherein said substrate layer and said cladding layer are bonded to one another and the most prevalent metal in said first alloy is the same as the most prevalent metal in said second alloy and is silver and comprises at least about 92.5 w % of each of said substrate layer and said cladding layer, and said percentage of said most prevalent metal in said cladding layer is within 2 w % of the percentage of said most prevalent metal in said substrate layer.

2. The cladded jewelry element of claim 1, wherein said percentage of said most prevalent metal in said cladding layer is within 1 w % of the percentage of said most prevalent metal in said substrate layer.

3. The cladded jewelry element of claim 1, wherein additional metals in said substrate layer are limited to one or more of Au, Zn, Sn, Ge, Li, Si, and Cu.

4. The cladded jewelry element of claim 1, wherein said substrate layer is cold roll bonded to said cladding layer.

5. The cladded jewelry element of claim 1, wherein the thickness of the cladding layer is less than the thickness of the substrate layer.

6. The cladded jewelry element of claim 1, wherein the thickness of said cladding layer is less than 25% of the overall thickness.

7. The cladded jewelry element of claim 1, wherein the thickness of said cladding layer is 5-10% of the overall thickness.

8. The cladded jewelry element of claim 1, wherein said cladding layer consists of an age hardenable alloy.

9. The cladded jewelry element of claim 1, wherein said substrate layer consists of an age hardenable alloy.

10. The cladded jewelry element of claim 1, wherein both said cladding and said substrate layer consist of age hardenable alloys.

11. A combination metal alloy for jewelry use comprising
a cladding layer comprising a first alloy with about 1-2.5 w % palladium; and
a substrate layer comprising a second alloy absent palladium;
wherein said cladding layer and said substrate layer are bonded together, each of said first alloy and said second alloy is comprised of at least about 92.5 w % silver, and the percentage of silver in said cladding layer is within 2 w % of the percentage of silver in said substrate layer.

12. The combination metal alloy for jewelry use of claim 11, wherein additional metals in said substrate layer are limited to one or more of Au, Zn, Sn, Ge, Li, Si, and Cu.

13. The combination metal alloy for jewelry use of claim 11, wherein the thickness of said cladding layer is less than 25% of the overall thickness.

14. The combination metal alloy for jewelry use of claim 11, wherein said substrate layer is cold roll bonded to said cladding layer.

15. The combination metal alloy for jewelry use of claim 11, wherein the thickness of the cladding layer is less than the thickness of the substrate layer.

16. The combination metal alloy for jewelry use of claim 11, wherein the thickness of said cladding layer is 5-10% of the overall thickness.

17. The combination metal alloy for jewelry use of claim 11, wherein said cladding layer consists of an age hardenable alloy.

18. The combination metal alloy for jewelry use of claim 11, wherein said substrate layer consists of an age hardenable alloy.

* * * * *